United States Patent [19]

Pritchard

[11] Patent Number: 4,584,512
[45] Date of Patent: Apr. 22, 1986

[54] MICROSTEPPING DRIVES WITH WAVEFORM TUNING AND MICROPROCESSOR CONTROL

[76] Inventor: Eric K. Pritchard, 1702 Plymouth Ct., Bowie, Md. 20716

[21] Appl. No.: 558,836

[22] Filed: Dec. 7, 1983

Related U.S. Application Data

[60] Continuation-in-part of Ser. No. 318,621, Nov. 5, 1981, which is a division of Ser. No. 125,297, Feb. 27, 1980, Pat. No. 4,302,712.

[51] Int. Cl.$^4$ .............................................. H02P 8/00
[52] U.S. Cl. ..................................... 318/696; 318/685
[58] Field of Search ............................... 318/696, 685

[56] References Cited

U.S. PATENT DOCUMENTS 4,218,643  8/1980  Herald ................................. 318/696
4,443,746  4/1984  Araki .................................. 318/696

Primary Examiner—William M. Shoop, Jr.
Assistant Examiner—Saul M. Bergmann
Attorney, Agent, or Firm—Barnes & Thornburg

[57] ABSTRACT

These microstepping stepping motor drives have analog and digital embodiments which generate tunable motor current waveforms to reduce low-frequency resonance effects and to make the microsteps more accurate. One digital driver is based upon a microprocessor which includes means for altering the motor current waveforms during a setup mode in response to sensed motor motion. The basis for this operation is in antecedent applications. The waveform alteration process iterates on the harmonic content of the motor motion to alter waveform determining values. The controller also has the capability of creating default motor current waveforms from an input code. It also has the control capability of pulse buffers, and can follow an external velocity input.

76 Claims, 7 Drawing Figures

MICROSTEPPING DRIVES WITH WAVEFORM TUNING AND MICROPROCESSOR CONTROL

BACKGROUND OF THE INVENTION

This application is a continuation-in-part of my application "Improved Driver Circuit for a Stepping Motor", Ser. No. 318,621, filed Nov. 5, 1981. That application is a divisional of my patent "Method of Minimizing Resonance in Stepping Motor and Improved Driver Therefor", U.S. Pat. No. 4,302,712 Ser. No. 125,297, filed Feb. 27, 1980, issued Nov. 24, 1981.

This invention relates to stepping motors and to the electronic means for energizing them in response to an input, and more specifically controlling or minimizing the low-frequency resonant effect in stepping motors. This invention further relates to analog and digital designs for said energizing means and to computer control of a stepping motor. This invention does not relate to parametric instability of stepping motors and their drives.

This invention is an improvement upon my U.S. Pat. No. 4,100,471 which discloses a stepping motor driver that electronically subdivides the motor's natural step into many small steps. the disclosed electronics consisted of a voltage divider, analog multiplexers to select a voltage divider tap in response to an input, and output amplifiers for energizing the stepping motor in response to the multiplexer outputs. This disclosure explains further that the resistance value of said voltage divider may be adjusted to minimize the effects of low-frequency resonance.

Patterson, et al in U.S. Pat. No. 4,115,726 analyzes the harmonic behavior of stepping motors. This analysis led them to create sine and cosine current waveforms for stepping motor and introduce third harmonic sine and cosine currents to minimize the resonance effects. Although the adjustment procedure is simple in a drive with only third harmonic resonance compensation, it rapidly becomes complex as greater compensation is required.

The prior art analyses of stepping motors use a number of simplifications which do not consistently hold true. The invalid assumptions are: (1) the motor torque is a linear function of current; (2) the frequency of interest is the resonant frequency of the stepping motor; (3) all harmonics are negligible when compared with the amplitude of the fundamental frequency; (4) the motor resonant frequency is not affected by resonance minimization adjustments, and (5) the motor windings of a two-phase motor are 90 degrees apart magnetically.

The stepping motor torque is a function of its magnet flux which is related to winding currents by motor geometry and the familiar non-linear B-H relationship found in magnetic materials. This non-linear relation is an odd function if the hysteresis is neglected. Odd functions produce odd harmonics from spectrally pure inputs.

Although Patterson, et al assert that odd harmonics are the only harmonics necessary to compensate a stepping motor, this added source of odd harmonics was not anticipated.

Large, uncompensated harmonics have frustrated attempts to compensate motor resonance. These harmonics create large forces which react with the motor resonance and torque/displacement non-linearities to produce a motion resistant to adjustment.

A reanalysis of the prior art showed that the frequency of interest needed to be detected in the motor, a task previously assigned to the motor's mechanical resonance.

The above motor adjustment problem occurs primarily when making adjustments for the motor's second harmonic. Although the second harmonic has been believed to be function of phase gain imbalance, further investigation showed that it is also created by interaction of the first and third harmonics since uncompensated third harmonics can contribute significantly to second harmonic resonance or instability and thereby complicate the adjustment process by demanding third harmonic adjustment at the second as well as the fourth harmonic operation rates.

The motor torque is a function of winding current, albeit non-linear. The torque variation for various waveforms can be seen in my paper "Analog Operation of Stepping Motors" in the *Proceedings of the Sixth Annual Symposium on Incremental Motion Control Systems and Devices,* May 1977.

Consequently, the resonant frequency, a function of the torque, is a function of winding current. Adjustments in the waveshape to avoid resonance can alter the motor torque which then alters the resonant frequency. Basically, the torque is changed approximately 20 percent as the waveform changes from a triangle to a sinusoid. This will give a 10 percent shift in resonant frequency. Thus, the waveshape adjustment appears to be resonant correction until the motor operating frequency is changed accordingly. A separate resonant device which is independent of motor torque avoids this problem.

Burnett discloses a digital stepping motor driver in U.S. Pat. No. 3,885,210 which is based upon trapezoidal shaped motor currents. This driver changes only one current at a time, all of the other currents are either zero or a maximum. Thus, to correct for a motor position, only one current can be changed at one time. This current is adjusted until the motor aligns itself to the proper position, i.e. the magnetic field in the motor is at the proper angle. The trapezoidal waveform driving technique produces a large variation in torque from the maximum full step torque to the minimum half step torque. Although ideal motors produce a half step torque of 70% of the full step torque, others produce approximately 50%. This variation in torque produces a velocity variation when the motor is operated with a load or with some velocity. In either case some torque will be necessary to rotate the motor. The resulting lag angle, i.e. the difference in the static position rotor position demanded by the winding currents and the actual rotor position, will change because the torque characteristic changes with position. In fact the torque changes at the fourth harmonic or full stepping frequency.

To avoid this problem of torque variability over the cycle of fractional steps, one must control two currents simultaneously to control the magnitude of the motor magnetic field as well as the angle of the said field. In an ideal motor, the position is the arctangent of the ratio of the winding currents and the torque is proportional to the square root of the sum of the winding currents squared. The desireable adjustment is then to create evenly spaced steps with similar torque/displacement derivatives. Thus, it is not desirable to adjust a winding current independently of all other current steps. It is desireable to alter the current in at least two windings at each motor step so that both motor position and motor torque can be controlled. Furthermore, it is not desireable to adjust steps independently but to adjust then in groups because the adjustments are interrelated by the extent of their harmonic impact.

Welburn in U.S. Pat. No. 4,284,940 discloses a stepping motor driver that consists of a counter, digital-to-analog converter, two waveform shapers, an analog multiplexer, and output amplifiers. The outputs of the digital-to-analog converters are biased with an adjustable current. The non-linear amplifiers alter the nominal triangular output of the digital-to-analog converter to some waveform more sinusoidal. The adjustable current introduces a square wave and its associated harmonics into the output amplifiers. The Welburn disclosure does not indicate the effects of this adjustable current. It is believed that its only use is to make the two adjacent steps with a zero digital-to-analog converter output different. This argument is presented in my U.S. Pat. No. 4,100,471. In fact, the usefullness of this signal as a waveform shaper is questioned because any significant current would force a large step at every step that causes a change in the multiplexer input selection, ie. every full step. Furthermore, this step could be either in the direction of motion or opposite the direction of motion depending upon the polarity of said current.

The prior art microstepping drives are basically function generators. There is the Burnett type of drive which selects values from tables of individual values to create the waveform. Patterson extends this technique two ways, first the values are no longer individual but tabulations of a function, and second, there are two tables or more tables per motor phase with the values of the tables added after amplitude adjustment.

Stepping motor controllers, i.e. preset indexers and interpolators, are associated with stepping motor drivers. These controllers are now taking advantage of the recent advances in computers and microprocessors. My U.S. Pat. No. 4,262,336, discloses a processor which directly controls a fractional-step stepping motor driver with numbers instead of pulses. A company, Cybernetics Micro Systems, produces a specially programmed microprocessor, the CY512, which acts as a preset indexer and stepping motor driver logic needing only the output stage to drive the motor in full steps.

SUMMARY OF THE INVENTION

An object of the present invention is to provide a tuning means which may or may not be incorporated into a sophisticated stepping motor drive for the minimization of the low-frequency resonance effects.

Another object of the present invention is to provide a an adjustment means for adjusting a plurality of harmonics of the fundamental motor drive current.

Still another object of the present invention is to provide a resonant compensation means which provides maximum torque without overheating the stepping motor.

Still another object of the present invention is to provide a means of measuring the resonant frequency causes without the linearity and stability problems created by the stepping motor.

A further object of the present invention is to provide a stepping motor driver which is capable of adjustment for resonant effects by using a plurality of step values wherein said values may be voltage sources created by a voltage divider or may be the contents of digital memory.

Another object of the present invention is to provide means for compensating in the stepping motor driver for the non-orthogonality of the motor windings.

Another object of this invention is to generalize the interpolation techniques implemented in analog circuitry to a digital technology.

Another important object of this invention is to create the position command waveforms for smooth stepping motor operation with digital circuitry and to permit the position command waveform to be altered dynamically.

Still another object of this invention is an adjustable waveform stepping motor driving means which does not use potentiometers.

Another object of this invention is an adjustable waveform stepping motor which can be commanded to assume any one of a variety of default waveforms to make the waveform adjusting process either optional or simpler.

Another object of this invention is a generalized stepping motor driver/translator based upon a microprocessor.

Other objects, advantages, and novel features of the present invention will become apparent from the following detailed description of the invention when considered in conjunction with the accompanying drawings.

DESCRIPTION OF THE PREFERRED EMBODIMENTS

Figure 1:
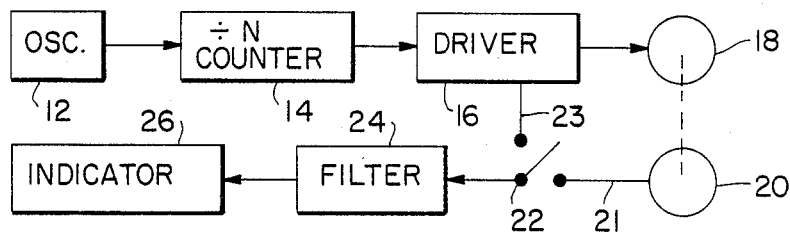
FIG. 1 is a schematic of a system incorporating the principles of the present invention for sensing the resonance of a stepping motor.

A stepping motor adjustment system as illustrated in FIG. 1, consists of a variable frequency oscillator 12 and a presettable division counter 14 which controls a stepping motor driver 16. The driver 16 drives motor 18 which produces a motion measured by sensor 20. Switch 22 selects the sensor output at 21 or a driver test signal at 23 for signal processing by filter 24. Indicator 26 reads out the level of the signal selected by the filter 24.

Figure 2:
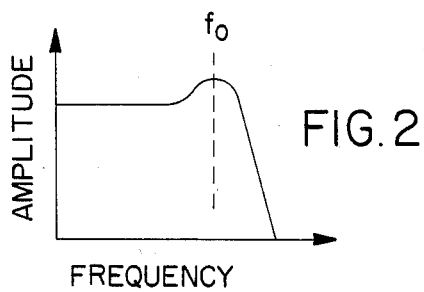
FIG. 2 is a graph of the frequency response of a stepping motor.

The general adjustment procedure is to first throw switch 22 to select the drive marker signal 23, set the variable division counter 14 to one, and adjust the oscillator frequency to maximize the indicator reading. Now, the oscillator frequency is the reference frequency for the driver 16. By adjusting the oscillator frequency, the fundamental frequency of the driver is matched to the center frequency of the filter 24. Note that the filter 24 is chosen so that its center frequency is below the resonant frequency of the stepping motor and in the flat response region as shown in FIG. 2. This aids the adjustment process since the motor's nonlinearities and instabilities are not excited below its resonant frequency. Note, further that by selecting a fundamental frequency of the driver matched to the center frequency filter operation of the motor at its Nth harmonic can be achieved simply by setting the counter 14 to N.

Second, the switch 22 is thrown to select the sensor output 21 and the fundamental frequency adjustments are made to minimize the indicator readout.

Third, the variable divider of the counter 14 is set to two so that the motor's second harmonic effects will be selected by the filter 24 and the adjustments for the motor's second harmonics are made.

Fourth, the variable divider of counter is set to four, eight, etc. and the appropriate adjustments are made to minimize the indicator read out. Setting the counter to four divides the motor operation rate by four so that the fourth harmonic effects will be in the bandpass of the filter; setting at eight will select the motor's eighth harmonic effects.

Fifth, the process is repeated until satisfactory results are obtained, ie. the indicator readings are sufficiently low at all frequencies.

Since the frequency to be detected is in the motor motion, a tachometer 20 is preferably used. The filter 24 forms a resonant device which achieves the same function as the motor resonance in Patterson, etal. without the linearity and stability problems created by the stepping motor. The system uses a low-frequency filter 24 such as a two-pole state variable bandpass type to achieve a narrow bandwidth. The stepping motor response, as illustrated in FIG. 2, albeit resonant and underdamped, is really a low-pass filter. The low-pass filter passes signals which have not yet been minimized and can confuse an unsophisticated indicator. In contrast, the bandpass fiter response, shown in FIG. 3, rejects all undesireable signals and allows for a simple indicator such as a meter.

By way of example, the filter 24 may have a center frequency of approximately one-sixth of the resonant frequency of the motor and a bandwidth of approximately 2 Hz. This bandwidth could be wider if the filter response were sharper. The motor position signal fundamental frequency or desired harmonic should be within the bandwidth of the filter.

An overview of this procedure is that it is similar to a spectrum analyzer. The spectrum analyzer effectively sweeps a filter frequency over the fixed frequencies of interest, while this procedure is sweeping the frequencies of interest past a fixed filter. Obviously, one could use a spectrum analyzer or an equivalent plurality of filters, one for each harmonic of interest, so long as the motor is driven so that the highest harmonic of interest is below the resonant frequency of the motor. Consequently, the motor operation is quite slow.

Although a simple meter is effective, a more sophisticated indicator is more effective because it can, if properly used, show the relative phase of the filter output and the driver signals. The relative phase often helps select which adjustment to make.

A system application, which uses stepping motor drivers of known resolution and which employs accurate frequency source, need not go through the first step of adjusting the reference frequency so that the fundamental frequency of the position command signal is equal to the resonant frequency of the filter.

The effect of the adjustment system and procedure is to make all of the motor steps approximately the same size. This is done in several steps which maybe repeated. First, the fundamental frequency adjustments makes the motion by the stepping motor in one half of the motor's electrical cycle approximately equal to the motion in the other half of the cycle wherein the demarcation between halves is arbitrary. Second, the adjustments for the motor's second harmonic makes the motion traveled in the odd quarters of the motor's electrical cycle approximately equal to the even quarters of the motor's electrical cycle, again independent of the quarter demarcation. Thus, adjustment the Nth motor harmonic makes the motion of the stepping motor during the odd 2Nths of the motor's electrical cycle approximately equal to the motion during the even 2Nths, again irrespective of demarcations. Since the driver waveform is independent of frequency, at least in the subject mechanical resonance region, the lack of resonant behavior at one frequency implies the lack of resonant behavior at another frequency. From another point of view, if the step sizes are all approximately equal, the mechanical resonance can not be excited signficantly in a constant velocity environment.

The adjustments for the motor's fundamental frequency resonant effects are for the reminant magnetization in the motor which appears with all of the other d.c. offsets in the system. The adjustments for the motor's second harmonic effects vary the relative gains of the motor phases and their angular relationship. The remaining adjustments affect the general shape of the motor current waveform. The adjustments for the motor's fourth harmonic primarily affects the third and fifth harmonics of the current waveform. Similarly, the adjustments for the motor's eighth harmonic primarily affects the seventh and ninth harmonics of the current waveform.

The driver adjustments are preferrably adjusted to nominal values prior to doing the above procedure. The d.c. offsets and orthogonality adjustments are set to zero and the relative phase gain is set to one. The waveshape is set to produce sinusoids or preferrably set to the waveform that is preferred by the type of motor being adjusted.

THE ANALOG EMBODIMENT

Figure 4:
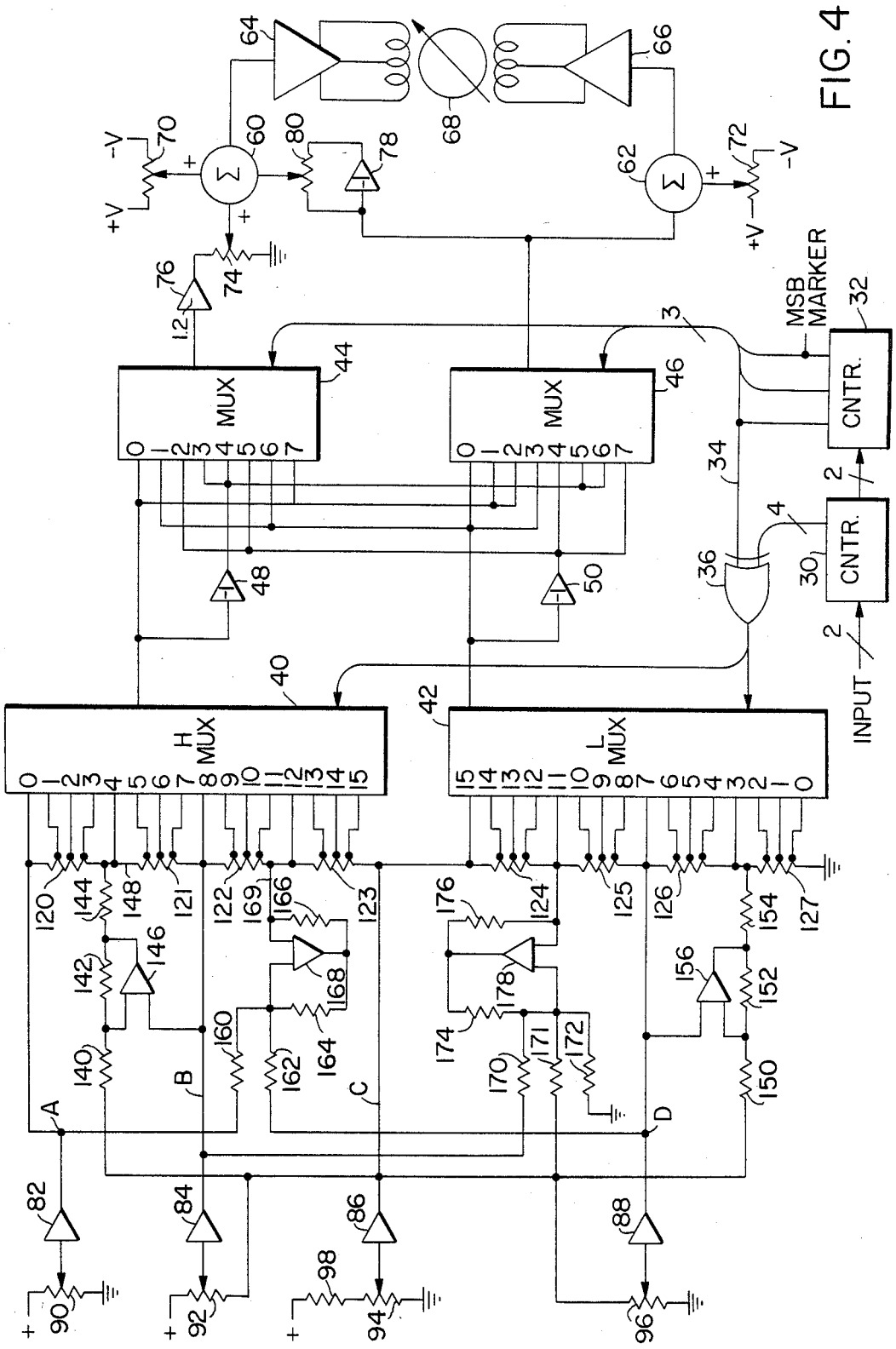
FIG. 4 is a schematic of a stepping motor drive as disclosed in my U.S. Pat. No. 4,100,471 improved to incorporate the adjustment principles of the present invention.

A stepping motor driver capable of being adjusted and used in the system of FIG. 1 is illustrated in FIG. 4. The basic system which is described in my U.S. Pat. No. 4,100,471 includes two stage counters or other source of digital control, driving two sets of analog multiplexers. The selected analog signals are then applied to the output amplifiers of the type found in my U.S. Pat. No. 4,140,956. The outputs of the amplifiers energize the windings of a stepping motor. For the purposes of illustration, a four-phase motor 68 is shown, although the circuit of the present invention can be utilized for any stepping motor.

The counter or digital control are in two stages, 30 and 32. The least significant bit 34 of the second stage counter 32 is used to selectively invert the output of the first stage counter 30 with plurality of exclusive OR gates 36. The effect of this circuitry is to create a control signal to first multiplexers 40 and 42 which selects inputs zero through fifteen, fifteen through zero, zero through fifteen, etc. Each passage between zero and fifteen of the multiplexers 40 and 42 is equivalent to 45 degrees of the stepping motor's electrical cycle or one-half of a full step. The second stage multiplexers 44 and 46 create two waveforms in quadrature by selecting the outputs of multiplexers 40 and 42 or their negative values as created by inverting amplifiers 48 and 50.

Starting with an initial counter states of zero and progressing upward, the multiplexer 46 selects the output of multiplexer 42. This multiplexer selects a step value from the lowest point in the voltage divider formed by resistors 120 through 127, in particular the tap closest to ground in resistor 127. Note that the antecedant applications denote the voltage divider as element 52. As the counter value gets larger, the output of multiplexer 46 is changed to higher and higher taps on the voltage divider. Upon arrival of the sixteenth input pulse, the first stage counter 30 becomes zero and the second stage counter becomes a one. The exclusive OR gates 36 then invert the first stage zero to become fifteen again. The multiplexer 46 now selects the output of multiplexer 40 and the output of multiplexer 46 continues to be changed to higher and higher taps on the voltage divider as the first stage counter 30 moves toward fifteen. Upon the thirty-second input pulse, the first full step of the cycle is completed, the first stage counter 30 is again zero, and the second stage counter 32 is a two. Then the output of multiplexer is changed from lower and lower taps on the voltage divider until the sixty-fourth input pulse. At this point, the second full step of the cycle has been completed, the operations of the multiplexers 40 and 42 repeat and multiplexer 46 selects the appropriate negative values from inverting amplifiers 48 and 50. Upon the one hundred twenty-eighth input pulse, the fourth full step of the cycle and the entire cycle has been completed, the counters 30 and 32 are again zero and the process repeats itself. The multiplexer 44 is wired to select signals from the first stage multiplexers 40 and 42 and inverters 48 and 50 in a similar but thirty-two input pulses different manner which represents an ninety degree phase difference. The above selection order reverses when the counters are pulsed down instead of up.

Notice that the multiplexers select the outputs of many different interpolators during any full step of operation. Notice further that these interpolators produce step values.

The first and second stage counters 30 and 32 may be replaced by a digital register as disclosed in my U.S. Pat. No. 4,262,336 filed Apr. 27, 1979.

The outputs of the multiplexers 44 and 46 are position command signals which are then amplified by the amplifiers 64 and 66 for stepping motor 68. The amplifiers are preferable switching as disclosed in my U.S. Pat. No. 4,100,956, although they may be linear.

The circuitry between the multiplexers 44 and 46 and amplifiers 64 and 66 supplies two sets of motor compensations introduced with analog signal summers 60 and 62. d.c. offset levels are introduced with adjustment potentiometers 70 and 72. These adjustments are made when the fundamental frequency of the motor current is in the bandpass of the filter or when the most significant bit of the second stage counter 32, or marker, has the same frequency as the above disclosed filter resonant frequency. The relative phase gain is adjusted by potentiometer 74. Amplifier 76 with its small gain of approximately 1.2 allows relative phase gains on either side of one. Inverting amplifier 78 and potentiometer 80 force some of the signal from multiplexer 46 into the signal from multiplexer 44 to compensate for non-orthogonality between phases. The phase gain and orthogonality adjustments are made when the second harmonics of the motor currents is in the bandpass of the filter or when the marker frequency is one-half of the resonant frequency of said filter.

The remaining compensation is performed upon the voltage divider made of tapped resistors 120 through 127, antecedently noted as element 52. Amplifiers 82 through 88 fix voltages A, B, C, and D respectively at points within the voltage divider in response to the settings of potentiometers 90 through 96. Amplifiers 146, 156, 168, and 178 fix the voltages at other points in the voltage divider in response to voltages A, B, C, and D. The remaining points of the divider produce linearly interpolated values based upon their position in the voltage divider and the values of the closer amplifiers or ground. Basically all of the resistors except the bottom most resistor are the same value. The bottom resistor is half as large. The reasoning for this is discussed in my U.S. Pat. No. 4,087,732 and is to make the step across zero volts the same size as all of the others. Potentiometer 90 via amplifier 82 controls the top fourth of the voltage divider; potentiometer 92 via amplifier 84 controls the top half of the voltage divider; potentiometer 96 via amplifier 88 controls the bottom half of the voltage divider; and finally, potentiometer 94 controls the entire divider via amplifier 86, potentiometers 92 and 96, and amplifiers 84 and 88.

NON-LINEAR INTERPOLATION FOR THE ANALOG EMBODIMENT

The improvements disclosed by this application in the circuitry of FIG. 4 are in the inclusion of the components numbered between 100 and 200. These components create non-linear interpolators. The combination of potentiometers 92 and 96 with potentiometer 94 (found in FIG. 3 of the antecedent applications) forms non-linear product terms for voltages B and D.

The non-linear interpolation for the analog embodiment is shown in FIG. 4. This enhancement sets additional voltages along the voltage divider to smooth the generated waveform. These additional voltages are placed between fixed voltages in the voltage divider. Resistor 120 goes from the top of the voltage divider to its seven-eighths point, resistor 121 goes from the seven-eighths point to the three-quarters point, etc., until resistor 127 connects the one-eighth point with ground. Buffer amplifiers 82, 84, 86 and 88 produce voltages known as A, B, C, and D respectively and having values AV, BV, CV, DV respectively.

The improvement to this embodiment is the inclusion of non-linear interpolators to smooth the position command waveform. The non-linear interpolators cut the length of the linear interpolation in half. Thus, the waveform is created of 32 straight lines of 4 step values instead of 16 lines of 8 step values. This embodiment uses two non-linear interpolation circuits, one for quadratic interpolation and one for cubic interpolation.

A quadratic interpolator drives the seven-eighths point along the voltage divider and is formed by resistors 140, 142, 144, and operational amplifier 146. Resistor 140 conducts current from voltage C to the inverting input of the operational amplifier 146. Resistor 142 feeds back approximately the same current from the amplifier output to the inverting input. Resistor 144 drives the voltage divider at the junction of resistors 120 and 121. The non-inverting input of the amplifier is connected to voltage B. By making resistors 120, 121, 144, 142, and 140 the values of 400 ohms, 400 ohms, 600 ohms, 1 kilohm, and 2 kilohms respectively, for example, the seven-eighths point 148 or V(148) along the voltage divider is now has the following voltage:

$$V(148) = 3*A/8 + 3*B/4 - C/8$$

instead of $$V(148) = A/2 + B/2$$

Similarly, the one-eighth point is driven by another quadratic interpolator formed from resistors 150, 152, 154 and operational amplifier 156. The resistor 154, however, has a different value because the resistor 127 is 350 ohms instead of 400 since the resistance from the zero input of multiplexer 132 is 50 ohms instead of 100. The smaller value produces a step which is symmetrical about zero volts.

A cubic interpolator drives the five-eighths point of the voltage divider, point 169. This interpolator is made of resistors 160, 162, 164, 166 and operational amplifier 168. Resistors 160 and 162 conduct current from voltages A and D respectively to the inverting input of operational amplifier 168. Resistor 164 feeds back an approximately equal current from the output of operational amplifier 168 to its inverting input. Resistor 166 provides positive feedback to the non-inverting input of operational amplifier 168. When one looks at this circuit from the non-inverting input of amplifier 168, it appears to be a negative resistance from a voltage having a value between A and D. By making the resistors 122, 123, 160, 162, 164, and 166 have the values of 400 ohms, 400 ohms, 2 kilohms, 2 kilohms, 1 kilohm, and 1800 ohms respectively, for example, the circuit appears to be a resistance of −1800 ohms from a voltage of A/2+D/2. This all combines to give the voltage at the five-eighths point or V(169) the following value:

$$V(169) = 9*B/16 + 9*C/16 - A/16 - D/16$$

instead of the linear interpolated value of $$V(169) = B/2 + C/2$$

The other cubic interpolator is formed similarly with resistors 170, 171, 172, 174, 176 and operational amplifier 178 to drive the three-eighths point of the voltage divider. The extra resistor is used and the resistors have different values because the bottom eighth of the voltage divider is only 350 ohms. Nominally, resistors 120 through 127 are tapped at four equal points, 100 ohms apart. This provides for a linear interpolation between points set by the various amplifier circuits.

Although the values V(148) and V(169) are linear in their inputs A, B, C, and D, the values combined with their inputs when plotted form a curve hence the values are created via an interpolation method based upon a curve, not a line, hence they are non-linear interpolated values.

The proceedure for finding the functions for V(148) and V(169) is found in the mathematic arts. In this context, the proceedure is to pass the desired function through adjustment values at positions corresponding to the multiplexer input number or the input pulse number. The coefficients of this function are then determined as a function of the adjustment values. The coefficient functions are then substituted in the function and the function is evaluated at the multiplexer input number corresponding to the location of the desired interpolated step value.

A harmonic analysis of this driver shows that the voltage divider produces only odd harmonics in the driver output irrespective of the voltages on the individual taps because of the ordering of the selection of the taps by the multiplexers 40, 42, 44, and 46 and of the algebriac inversion amplifiers 48 and 50. The intensity of the harmonics are dependant upon the values of the voltage divider taps which are in turn dependent upon the potentiometer adjustments. Although each potentiometer affects all of the harmonics, the potentiometers affect each harmonic differently as indicated in a table below. The strategy, then, is to perform a series of adjustments which interact as little as possible.

The resistor 98 is used to limit the level of the center of the voltage divider to approximately 71 percent of the maximum. An analysis of the power of a maximum power waveform that can be generated by the waveform generator is approximately 125% of the power of a maximal sine wave. If resistor 98 were not installed the maximal power would be 166% higher. Thus, resistor 98 limits the power that the waveform can possibly produce, limits the power in the motor, and helps keep the motor from overheating severely.

Quadratic interpolators including components 140, 142, 144, 146, 150, 152, 154, and 156, cubic interpolators including components 160, 162, 164, 166, 168, 170, 171, 172, 174, 176, and 178, are all interpolators with three or more amlitude determining inputs. Furthermore, each interpolator only deals with a segment of the waveform, a fraction of a full step, a significant feature and a significant difference over the prior art. Furthermore, more combinations of interpolators may be found when the linear interpolating resistors 120 through 127 are also included. The interpolators and said resistors may also be considered an interpolator with five inputs. One of the distinguishing features of the present invention is that the waveform interpolator has more than two inputs. In this context the inputs to the waveform interpolator of the present invention are voltages A, B, C, D, and ground for a total of five. In fact all of the non-linear interpolators disclosed herein have more than two inputs.

The tapped resistors 120 through 127 are also interpolators, although linear, which create values for a segment of the waveform, also as a fraction of a full step.

Figure 3:
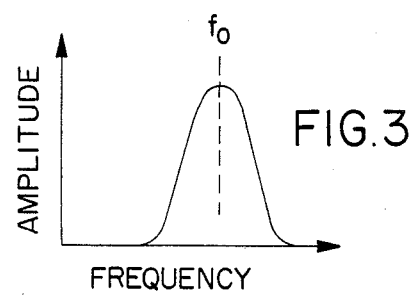
FIG. 3 is a graph of the frequency response of the preferred filter.

Notice that the antecedent disclosure showed in its FIG. 3 the circuit in this disclosure's FIG. 4 without the quadratic and cubic interpolators. The resistors 120 through 127 are collectively known as element 52 in the antecedent applications. The same voltages, A, B, C, and D, drive the same locations in the voltage divider. Then seven multiplexer inputs are linearly interpolated between two voltages instead of the three found in the present disclosure. Thus, the antecedent application also disclosed an interpolator with five inputs, in particular, more than two inputs.

Thus, the improved analog embodiment has disclosed linear and non-linear interpolation circuits which create the position command signal values used to drive a stepping motor. These values are the voltage divider voltages. The adjustment values are the potentiometer voltages, ie. AV, BV, CV, and DV.

THE DIGITAL EMBODIMENTS

There are two digital embodiments, one is based upon tuning with an external computing device and the other is based upon tuning with the same processor that controls the motor generally. Both embodiments digitally interpolate values to create values that are used to drive a stepping motor. These values are stored in a digital memory means and are similar to corresponding values in the analog embodiment. Consequently all of the same arguments to interpolation remain valid.

THE EXTERNAL TUNING SYSTEM

Figure 5:
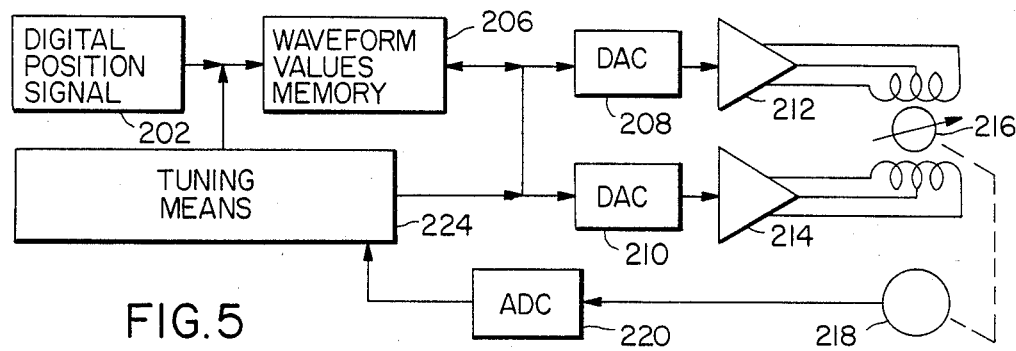
FIG. 5 is a schematic of a digital tuning system and stepping motor driver for sensing the resonance of a stepping motor.

An external digital tuning embodiment is shown in FIG. 5 in combination with a driver system. The digital position signal producing means 202 is the combination of exclusive or gates 36 and counters 30 and 32 of FIG. 4 or is a computer as disclosed in my aforementioned copending application which has since become U.S. Pat. No. 4,262,336. During normal operation, a digital position signal producing means 202 provides the address for the non-volatile memory, battery operated volatile memory, or programmable read-only memory 206. The addressed memory word drives digital-to-analog converters 208 and 210 to produce the position command signals needed by the transconductance amplifiers 212 and 214 to energize the stepping motor 216. The transconductance amplifiers may be linear, but are preferably of the design disclosed in my patents or applications mentioned above. This portion of the digital embodiment is generally similar to the disclosure in my U.S. Pat. No. 4,087,732.

During the tuning operation of this digital embodiment particular sequences of values needed for tuning are created by the tuning means 224 and passed directly to the digital-to-analog converters 208 and 210. These converters create the position command signals which are amplified by transconductance amplifiers 212 and 214 to drive the stepping motor 216. The resulting shaft motion drives a motion sensor 218 and analog-to-digital converter 220. The converted data is then feed back to the computing means 224 for the creation of a new sequence of step values. Once a sequence of step values has been found to produce a minimum resonance, the sequence is stored in the memory 206.

The function of signal processor or filter 24 of FIG. 1 is performed by the analog-to-digital converter and the software in the computer. The computer must in some one of the many possible ways interface with the memory 206 to set it after the tuning is done. In the terms of the microprocessor development systems the tuning means is an emulator as well as a memory programmer since it takes control of the stepping motor.

There are, of course, many ways to configure the hardware to perform the tuning function. For example, a drive using a standard programmable read-only-memory could be tuned by removing said memory from said drive and substituting a connection to the tuning means therefor. The tuning means would then take over control of the stepping motor as described above and then program a new or erased memory. The connection between the said drive and said tuning means would then be removed and the new memory replaced. The important, common feature is the tuning and the tuning algolrithms. Of course, the diagramed method would be simpler to use. Alternatively, the tuning means might also be connected via a dedicated connector which must carry all of the information to operate the digital-to-analog converters and program the memory.

The functional description of the tuner is that of the perfered computer embodiment below. The operation and algolrithms of the tuner is the same as the tuning modes (modes 3, 4, and 5) of FIG. 7. The hardware of the tuner is the computer portion of FIG. 6 with due care taken for the tuner/drive interface, a task trivial for one skilled in the art. The memory 206 of FIG. 5 has the same function as the memory 307 of FIG. 6.

THE PREFERRED COMPUTER EMBODIMENT

Figure 6:
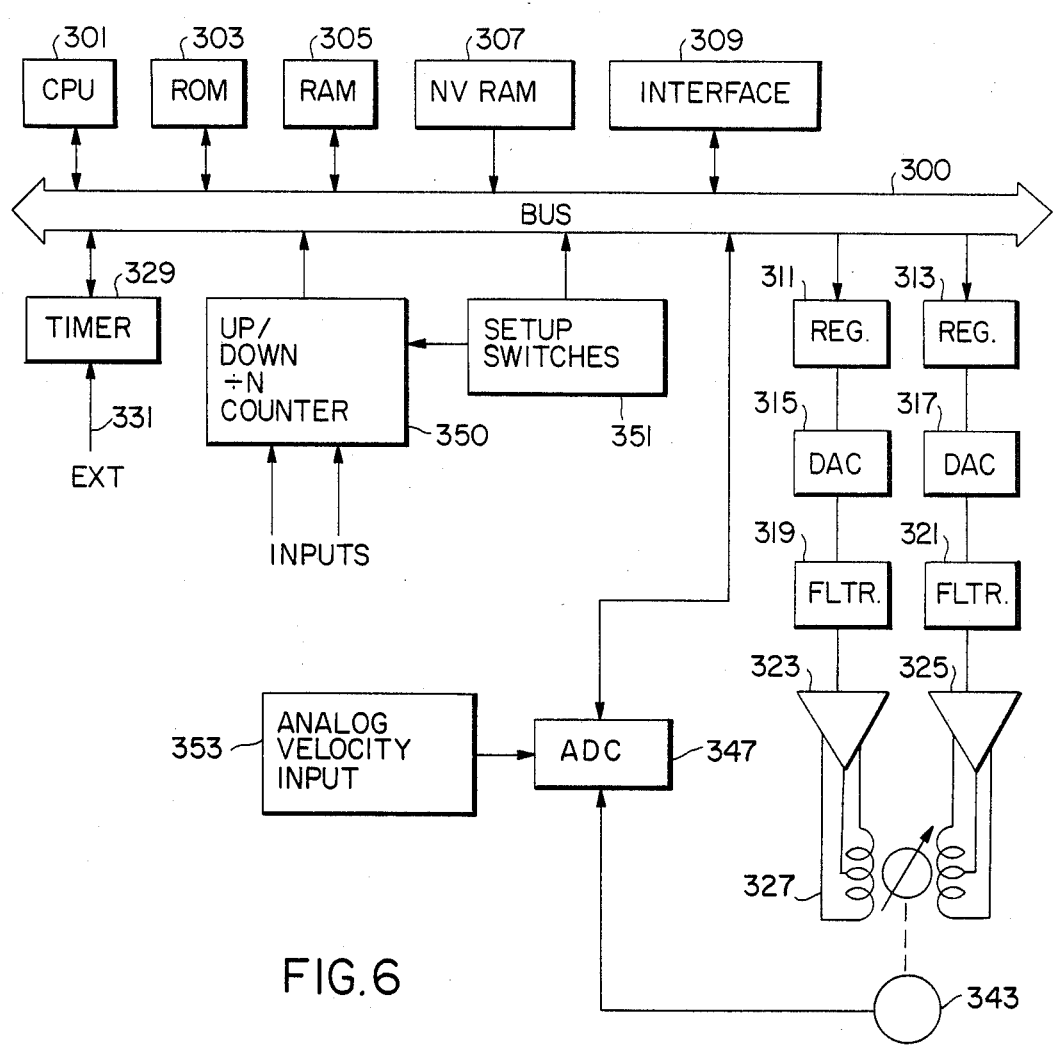
FIG. 6 is a block diagram of a microprocessor based, tunable microstepping stepping motor drive.

The preferred computer embodiment is shown in FIG. 6. This embodiment controls the motor in normal and novel control applications as well as tunes the stepping motor in a waveform generation mode. This computer consists of a central processor unit 301 for computing stepping motor positions and motion control parameters, a read-only memory 303 for storing programs, a random access memory 305 for storing data, a non-volatile memory 307 for storing the stepping motor drive waveforms, a communications interface 309 for receiving inputs and providing status outputs to a high level motion controller, registers 311 and 313 for temporarily storing a waveform value, and digital-to-analog converters 315 and 317 for converting the waveform numbers to analog values. The operation of this stepping motor driving means follows usual computer operations with the intent that the motion producing programs compute a desired stepping motor position value which is used to look up the associated waveform or step values in the non-volatile memory 307 and transfer step said values to registers 311 and 313 and then to digital-to-analog converters 315 and 317. These position command signals are filtered by 319 and 321 and amplified by transconductance amplifiers 323 and 325 to current levels suitable to drive the stepping motor 327. The timer 329 initiates a stepping motor position calculation. The timer may also operate with an external source by input 331. An example of the timing hardware is disclosed in my U.S. Pat. No. 4,262,336, included herein by reference.

The processor is programmed to control the stepping motor, to sense the resultant motion, and to create a new waveform. The processor can do these tasks without requiring special operator skills and equipment that the analog version requires. Since operating the motor at various speeds to put the harmonic of interest into the bandpass of the signal processor or filter 24 of FIG. 1 is akin to operating at a single speed with a plurality of signal processors with appropriate bandpass frequencies, and since a plurality of said processors is akin to a Fourier analysis, the computer can operate the motor 327 at a constant velocity, can acquire motion information from motion sensor 343 and analog-to-digital converter 347, and can transform said information to phase amplitudes of the various harmonics. The computer then can either report this information via the communication interface 309 or can act upon this information under its own programming in the aforementioned feedback control arrangement.

Notice that the digital embodiment does not require any potentiometers to adjust the waveforms. Every adjustment is created and fixed digitally. Additionally, the usual adjustments for offset and gain in the digital-to-analog converters are also not required because the system uses the converters to do the waveform correction and their errors are compensated with the motor errors. Voltage offsets are corrected by the fundamental resonance adjustment and gain variations are corrected by the second harmonic adjustments. Thus, this disclosure shows how one can make an adjustable waveform stepping motor driving system without the typical adjustment potentiometers.

One particular advantage the digital system has over the analog system is the digital capabilty for storing information. This storage can store the information needed to produce nominal waveforms for a variety of motors. There is a definite advantage to beginning the tuning process with a waveform close to the ultimate waveform; the tuning is simpler and faster. The capability to store and recall preset values in the read-only-memory for default waveform creation is now a trivial part of the computer art. The read-only memory can readily store this data for retrieval under command via the communications interface. This data would have to be produced with a statitical study of stepping motors to find the best fit for these values to the average motor of each type. Then the user via a command could initialize the waveform with the nominal waveform created from said values and could then perform said tuning in fewer iterations.

While there are many variations of non-volatile memories for 307, the preferred types are MNOS or tunneling oxides. These devices unfortunately have a limited number of writes available to the user. Therefor the waveform reshaping programs should operate from the random access memory 305 until the user is satisfied that the motor is operating sufficiently smooth and accurate and then the date can be transferred from memory 305 to memory 307. Another advantage in this approach is that the rewriting of such non-volatile memories can require significant times such as 20 seconds or more.

The computer art is repleat with connection arrangements for separating and connecting components of a system. It is not necessary that all of the components of FIG. 6 reside in the same place all of the time. For example, it is advantageous to assemble the motion sensor 343 and the analog-to-digital converter in a separate subsystem which is connectable to the central processing unit 301, the read-only memory 303, etc. when the non-volatile memory 307 needs to be programmed. In this way only the components needed for motion control need be packaged together for a cost savings of the analog-to-digital converter, etc. Thus, it is only necessary that the driver be able to receive a signal, which may be digital or analog, indicative of the motion of the motor for tuning the drive waveform.

It is further possible to separate the read-only memory into a plurality of devices, some of said devices containing waveform alteration programs being located with said converter in a separate package. It is further possible to have a plurality of communication interfaces, one of which is separable from the body of the computer and co-located with said converter to communicate waveform alteration commands to the computer and to receive status data from the computer. These possibilities are just examples of possible computer system arrangements. The important parts are a computer system which controls stepping motors in fractional steps of approximately equal size which do not excite the inherent resonances of the stepping motor and which can alter the waveforms which control the stepping motor when all of the proper components are present.

THE SIGNAL PROCESSING AND WAVEFORM GENERATION ALGOLRITHMS

Software controls the computer to iteratively perform a Fourier analysis of the sensed motion data and alters a sequence of values that create the position command signal. This arrangement forms a feedback loop which, of course, has all of the stability problems typically found in sampled data feedback control systems or numerical equation solution algolrithms. Fortunately the tuning is done infrequently and the tuning can be allowed relatively long operation times. This permits the loop gains to be relatively low or the solution convergence to be slow and the tuning process to be quite stable.

Using the computer to simultaneously control the motor and sense the motor motion effectively eliminates the step of making the signal processor or filter frequency correspond to the marker frequency when the fundamental is being processed and making the marker frequency a fraction of the processor frequency when the processing higher order harmonics. The computer creates a microstep and records the output of the analog-to-digital converter at approximately the same time. Having the computer perform this operation repeatedlly until an entire motor revolution has been completed acquires sufficient information to tune the waveform for the average electrical cycle.

An example of this automated tuning is the operation of the offset potentiometers 70 and 72. They produce a motion at the fundamental frequency in quadrature phases. The Fourier analysis detects and quantifies said motion with its sine and cosine terms. These values are then used to alter the digital offset values. Unfortunately, the sensitivity of the drive and the motor is may not be known and is certainly different for different types of motors. Thus, the adjustment must be done iteratively, just as a human operator changes the adjustment while watching an indicating device.

The tuning of the phase gain and quadrature are also adjustable by a similar Fourier analysis iteration.

The adjustment of the waveshape, i.e. potentiometers 90, 92, 94, and 96 in the analog embodiments, requires a more sophisticated analysis. The magnetically and geometrically non-linear motor combines the various harmonics of the driving currents with the various harmonics of the torque characteristic to produce the shaft motions. There are at least two possible approaches to the waveform creation: Computation of the waveform and emulation of the analog methods.

The computation method involves operating the motor with a purely sinusoidal waveform and measuring the results. The Fourier analysis of the motor motion will then give the harmonic content of the motor. Then by knowing the motor harmonic contents, the compensating waveform can be estimated from relationships of motor harmonic content and waveform harmonic content as outlined in the prior art. This estimation then alters the intensity of multiple harmonics to tune the motor. Unfortunately, this will not be quite the final answer. Smoother operation can be attained by also considering multiple harmonics which requires the solution of a system of multiple equations. Furthermore, the prior art analysis assumes a zero lag angle between the rotor and the stator magnetic field and does not account for the magnetic non-linearities which change the inductance and produce harmonics in a different manner. Consequently, this method will have to be iterated in order to produce smooth motion. Furthermore, the overall best waveform may not be the one that produces the smoothest motion during tuning with no load on the motor. Motor loading creates a corresponding lag angle between the rotor and the magnetic field since this is the way the motor creates torque. The harmonic interaction is different at different lag angles per the above equations and consequently creates rougher motion.

The preferred technique is similar the ideal analog technique. The computer is programmed with a number of default waveforms for a number of different motors or ratios of one-phase on to two-phases on torques. The user then selects one of the defaults and commands a tuning. The default waveform fixes the values AV and CV corresponding to potentiometers 90 and 94 and initializes the starting values corresponding to potentiometers 92 and 96. The fourth harmonic content of the motor motion then is used to adjust the value DV corresponding to potentiomter 96. The eighth harmonic content is used to adjust the value BV corresponding to potentiometer 92. This may be done iteratively since these adjustments interact or may be done simultaneously knowing the harmonic effects of these adjustments. The harmonic effects of these adjustments are readily found via a Fourier or harmonic analysis and are:

| HARMONIC SENSITIVITIES TO ADJUSTMENTS | | | | |
|---|---|---|---|---|
| Value Pot Harmonic | AV 90 | BV 92 | CV 94 | DV 96 |
| 1 | .2468 | .4560 | .6715 | .1889 |
| 3 | −.2223 | −.1702 | .4349 | .4109 |
| 5 | .1793 | −.1373 | −.1566 | .3313 |
| 7 | −.1273 | .2352 | −.0137 | .0974 |
| 9 | .0770 | −.1423 | .0083 | −.0589 |

The above senstivities are combined with extensions of the Patterson analysis to estimate changes in the adjustment values. For example, if the Patterson analysis extended from the third harmonic to consider the fifth then equation 60 of Patterson:

$$I3*C1 = 3*IP*C3 + 5*IP*C5 \qquad (1)$$

becomes the following:

$$C1*(I5* \cos(5*L) - I3* \cos(3*L)) = IP* \cos(L)*(3*C3+5*C5) \qquad (2)$$

and $$C1*(I5* \sin(5*L) - I3* \sin(3*L)) = IP* \sin(L)*(3*C3-5*C5) \qquad (3)$$

where
C1, C3, C5 are motor harmonic values,
IP, I3, I5 are current harmonic values, and
L is the rotor lag angle
Equation 2 evaluates the fourth harmonic content in the sine phase
Equation 3 evaluates the fourth harmonic content in the cosine phase
The equations 2 and 3 above are used to produce the constants K1, K2, K3, and K4 in the equations below:

$$DBV = K1*S4 + K2*S8$$

$$DDV = K3*S4 + K4*S8$$

where
DBV is the change in the BV value
DDV is the change in the DV value
S4 is the strength of the 4th harmonic
S8 is the strength of the 8th harmonic Notice that the choices for the constants are not critical so long as they are not large (high gain in a servo system) and are reasonable representative of the relative impact of the effects of values BV and DV. In fact, in the analog proceedure two of the constants, K1 and K4, are zero and the others are small.

The simplicity of this algolrithm and the consequential speed of waveform determination is quite dependant upon the the knowledge of the settings for potentiometers 90 and 94 or their corresponding adjustment values. These adjustment values are related to the ratio of the one-phase on torque to the two-phase on torque. This ratio is determined by the structure of the stepping motor in the rotor and stator tooth widths and skewing. Since these are manufactured properties, this ratio will be consistant and may be used to create the initial waveform of step values for tuning.

The common thread in all of the tuning methods is that a plurality of waveform harmonics are and must be adjusted simultaneously to attain the smoothest operation.

An examination of the analog embodiment shows that the position command signal is created from a plurality of potentiometer settings and a sequence of numbers from the number producing means, a counter or computer. If the potentiometer settings are viewed as presettable memory devices and the circuitry as a computation means, then the analog embodiment computes in an analog fashion the position command signal values for every change in the value from the counter or computer, the number producing means. The strict digital translation of this circuitry is expensive, however it was partially employed by Patterson et al. It is better to do the computation once and store the results in a memory for later recall.

The preferred algolrithm for creating the memory storage values may be derived by examining the analog embodiment. For example, the counters 30 and 32 output a 7 bit number which has 128 possible values. Hence, there are 128 possible values at the output of the multiplexers 44 and 46. These values are created with linear components from the voltages on four potentiometers. Therefor, the output of the multiplexers MUX44 and MUX46 for a number producing means output of the step number I are $$MUX44(I) = AV*AS(I) + BV*BS(I) + CV*CS(I) + DV*DS(I)$$

and $$MUX46(I) = AV*AS(J) + BV*BS(J) + CV*CS(J) + DV+DS(J)$$

where
J is related to I in a quadrature fashion: J = MODULO (I+32,128)
AV, BV, CV, and DV are values of voltages A, B, C, and D
AS, BS, CS, and DS are interplolation arrays
The values AS(I), BS(I), CS(I), and DS(I) are found in the interpolation algolrithms and may be equal to the sensitivities of the outputs to multiplexers 40 and 42 to the potentiometer voltages. Although there are only 32 inputs to 40 and 42 these values are repeated, reordered, and algebrically negated by amplifiers 48 and 50 and multiplexers 44 and 46 to create the entire array of 128 values.

The interpolator input values are more closely related to the potentiometer positions than their output voltages. Their voltages are the following functions of position.

$$AV = AP*VREF$$

$$BV = BP*VREF - BP*CV + CV$$

$$CV = CP*VREF*0.7071$$

$$DV = DP*CV$$

where AP, BP, CP, and DP are the positions of potentiometers 90, 94, 92, and 94 of FIG. 4 respectively. VREF is the voltage divider reference supply voltage. Notice that the voltage BV is dependant upon the product of two potentiometer positions BP and CP (CP by way of CV in the second term of the equation for BV). Thus, the voltage divider values are a non-linear functions of potentiometer settings, the adjustment input device and storage means.

The position command signals are generated by the digital-to-analog converters 208 and 210 or 315 and 317 can now be determined mathematically. These signals are similar to the outputs of summer 60 and 62 respectively. Denoting the position command signal from summer 60 as PCS60 and the position command signal from summer 62 as PCS62 then $$PCS62(I) = MUX46(I) + OFF72$$

and $$PCS60(I) = PG*MUX44(I) + OFF70 + Q*MUX46(I)$$

where OFF70 and OFF72 are the DC bias signals from potentiometers 70 and 72, PG is the overall gain of amplifier 76 and potentiometer 74, and Q is the gain of amplifier 78 and potentiometer 80. Thus, arrays PCS62 and PCS62 can be created from values AP, BP, CP, DP, OFF70, OFF72, PG, and Q once sensitivity arrays AS, BS, CS, and DS are computed from the analog circuitry or other tuning algolrithms.

The digital interpolator stores the values AP, BP, CP, DP, OFF70, OFF72, PG, and Q and arrays AS, BS, CS, and DS. While the arrays are constant, the values are not. They change from motor to motor as well as from motor type to motor type. As mentioned hereinabove, a universal initial conditions are AP=BP=100%, CP=DP=60%, and OFF70=OFF72=PG=Q=0. These values fit the median motor since they produce a waveform which is nearly sinusoidal with no other correction. However, practical motors generally prefer other waveforms. The digital interpolator stores these initial values for various types of motors and uses them to initialize the values AP, BP, CP, and DP upon operator command.

The Patterson et al. approach does not consider the maximum power level of the waveform driving the stepping motor. The disadvantage of this design decision is that the waveform levels must be kept artificially low to provide sufficient room for any possible compensation. However, a computing system has the power to normalize the values to keep the maximum power constant. The following computer statements express the technique.

```
PMAX = 0.
DO 1 I = 1,NMAX
PMAX = AMAX (PMAX , PCS60(I)**2 + PCS62(I)**2)
1 CONTINUE
A = SQRT(PMAX / PKPWR)
DO 2 I = 1,NMAX
PCS60(I) = PCS60(I) / A
PCS62(I) = PCS62(I) / A
2 CONTINUE
``` where NMAX is the number of steps per elecrical cycle of the motor, 128 for example. The power can be normialized to any value by multipling the value A by a constant just prior to the second DO loop. The net effect of this action is that any adjustment will undoubtedly change the value for A above and the values for PCS60 and PCS62 will be altered which will change the harmonic content of all harmonics, i.e. a single adjustment will alter a plurality of harmonics.

The above described digital interpolator has more than two inputs and includes multiple interpolators which define a fraction of one full step of the motor operation, albeit repeated in some manner for a fraction of the next full step.

COMPUTER OPERATION

Figure 7:
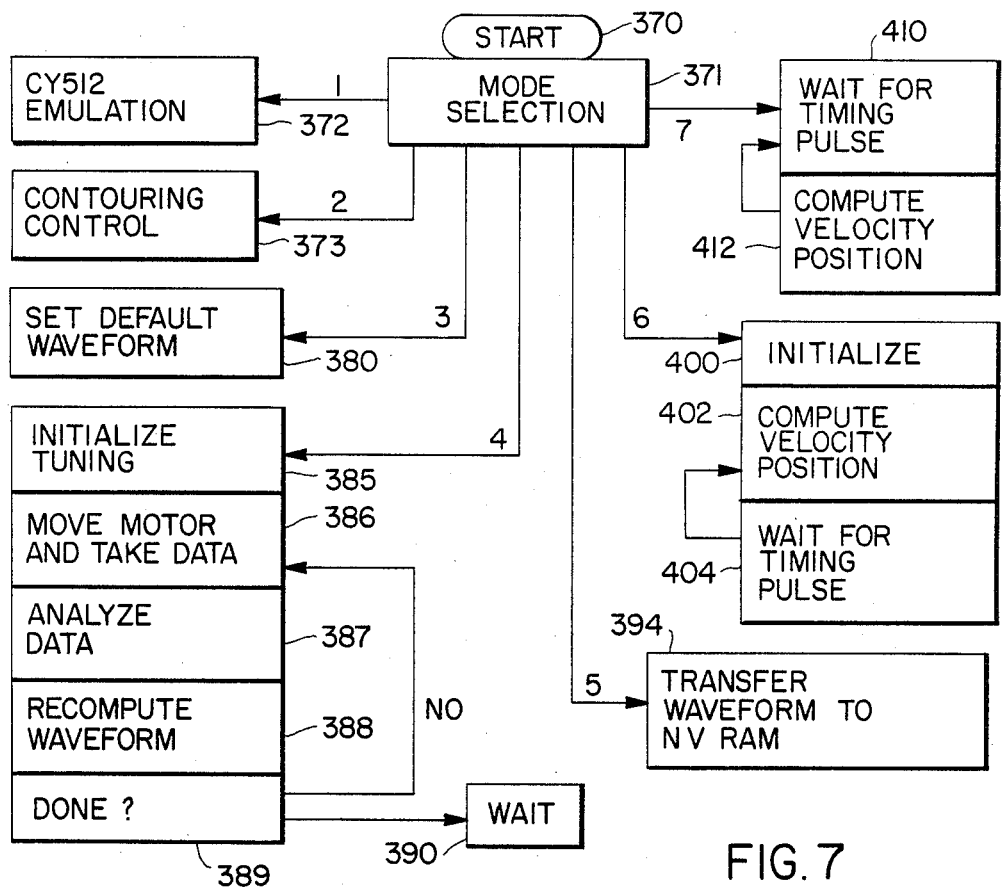
FIG. 7 is a flow diagram of the software for the microprocessor of FIG. 6.

FIG. 7 is an example of a flow diagram for the computer system of FIG. 6. The program starts upon the computer receiving power or upon being reset at block 370. At this point the computer performs any initialization operations needed. Then in block 371 the computer checks the setup switches for hardware mode selection. With adequate read-only-memory, the computer can have many modes. Mode 1 is the emulation of the Cybernetic Micro Systems, Los Altos, Calif., stepping motor controller model CY512 with fractional stepping techniques by the programming in block 372. Mode 2 is a contouring control such as illustrated in my U.S. Pat. No. 4,262,336 included herein by reference is performed in block 373. The remaining paths from block 371 are novel and are discussed below.

Mode 3 causes the computer to define the step values or waveform per a waveform code also entered into the setup switches. The computer in block 380 uses the switches to address its read-only-memory 303 for a set of stored parameters which are then used to define a waveform in the random access memory 305 according to the equations hereinabove or according another of the many possible algolrithms. This waveform may be used or it can simply be the initialization for mode 4.

Mode 4 tunes the waveform for the attached motor. Since the aforedescribed tuning technique is iterative, block 385 initializes an attempt counter to limit the number of trial tunings. The computer then in block 386 moves the motor slowly so that no harmonic of interest lies in or above the resonant frequency of the motor. Simultaneously, the computer acquires data from the analog-to-digital converter 347. By taking the data in synchronism with the motor motion, the association of the motor stepping frequency and the filter frequencies of the Fourier analysis is assured. An example of the FORTRAN code for performing this task follows:

```
C      Initialize the sum array
```

```
              -continued
C      There are 128 microsteps per cycle
       DO 1 I = 1, 128
1      S(I) = 0
C      Set timer for slow operation, 400 pulses per second
       CALL TIMER (400)
C      Begin stepping, first get to a constant velocity
       DO 2 I = 1, 400
2      CALL STEP
C      Step through one revolution, take data, and create
C      partial sums
C      There are 50 cycles per revolution.
       DO 4 I = 1, 50
       DO 3 J = 1, 128
       CALL STEP
C      Get the tachometer data at ADC input T
C      Increment a partial sum for later averaging
       S(J) = S(J) + ADC (T)
3      CONTINUE
4      CONTINUE
```

After making at least one complete revolution at a constant rate, the computer stops the motor and the data taking and begins the analysis in block 387. This analysis averages all data points taken in similar positions in the electrical cycle of the motor, which in this disclosure is, for example, 128 fractional steps of four full steps. This step is important because the motor rotor and the motor stator may not be concentric with the motor shaft. In this case the tuning must be a function of shaft position. The data then can more easily be handled by a Fourier analysis routine. This well-known mathematical algolrithm calculates the amplitude of the sine and cosine components of each harmonic within the discriptive capability of the sampled data. In this case, the amplitudes corresponding to the sines and cosines of harmonics 0 through 63 are available although by way of example only harmonics 1, 2, 4, and 8 are of particular interest. This data is then used in block 388 to alter the parameters and then to define a new waveform. The sine and cosine amplitudes of the first harmonic are used to change the values OFF70 and OFF72. The sine and cosine amplitudes of the second harmonic are used to alter the values PG and Q. And the amplitudes of the fourth and eighth harmonics are used to change BV and DV. The exact forms of the equations is determinable from the mathematical arts dealing with the numeric solution of equations. As mentioned above the extent of the change of the values OFF70, OFF72, PG, Q, BV, and DV must be limited to assure stability in this numeric solution, a matter also well-known in the mathematic arts. As typical with these solution algolriths, the attempt counter is then decremented and checked for zero in block 389. If non-zero the computer makes another tuning attempt. If the counter is zero the computer waits for the next command in block 390.

The complexity of tuning for the entire shaft rotation is not included in these examples. However, it could be performed in a similar manner if the shaft position information were available from a shaft encoder. In this case the fundamental frequency would correspond to the shaft rotation rate. The above harmonics are then scaled upward in number by the number of electrical cycles per rotation.

This iteration of the loop 386 through 389 is needed because stepping motor behavior is not uniform and thus, an exact solution cannot be created. It however, can be approximated with several attempts as recommended for the analog version.

Mode 5 transfers the waveform from the volatile random access memory to a more permanent storage means, the non-volatile memory 307 in block 394.

NOVEL CONTROL MODES

Mode 6 controls the stepping motor with a pulse buffer to permit the motor control to accomodate abrupt accelerations without losing synchronism. The notable prior art is Leenhouts U.S. Pat. No. 3,553,549, Inaba etal. U.S. Pat. No. 3,579,279, and Newell U.S. Pat. No. 4,119,902. This art discloses a means for driving a stepping motor as a function of the difference between the number of input pulses and the number of pulses delivered to the motor. Leenhouts creates a ramping by making this function non-linear. Newell creates the ramping by making the function a function of time as well by passing the difference through a low-pass filter.

The input pulses are received by the divide-by-N counter 350 of FIG. 6. The division N is set by the setup switches 351. The computer acquires the pulse count for each timing pulse from timer 329. The pulse count is converted to an internal position value by a table lookup. A new velocity is then computed as a function of the position difference and the old velocity. The motor position is then computed from the new velocity and the old position. This new position is used to look up the motor currents in the memory 307 and passed via registers 311 and 313 and digital-to-analog converters 315 and 317 to create position command signals. The position command signals are passed through filters 319 and 321, and amplifiers 323 and 325 to motor 327.

Specifically, in FIG. 7, mode 6 starts in block 400 with the initialization of the position correspondence table, the old velocity, and old position. This is accomplished by the following FORTRAN code:

```
       DO 1 I = 0, N-1
1      PCT(I) = (128 * I) / N
       OV = 0
       OP = PCT(UDC)
C      where due respect to variable typing is required
C      where N is the setup switch value
C          PCT is the position correspondence table
C          OV is the old velocity
C          OP is the old position
C          UDC is the up/down counter value
```

The control loop begins with block 402 wherein the up/down counter is read. This value is then used to address the table PCT to get an internal position value. Then the new velocity is computed. Then the new motor position is computed and put out to the motor driving hardware. The FORTRAN code illustrating these computations follows:

```
       NP = PCT(UDC)
       NV = K * F * (NP - OP) * (1—F) * OV
       OV = NV
       OP = OP + NV
       R1 = W1(OP)
       R2 = W2(OP)
C      where NP is the new position
C             NV is the new velocity
C             K is a preset constant
C             F is a preset time constant fraction
C             R1 is the phase one current register 311
C             W1 is the phase one current table
C             R2 is the phase two current register 313
```

| | |
|---|---|
| C | W2 is the phase two current table |

Then in block 404 the computer waits for the next timing pulse before looping back to the above computations.

Note that the above computer statement for computing NV controls the rate of change of the frequency of the position command signals. Since F is a fraction less than 1 the velocity can only change a fraction of the ultimate value on each calculation. Since this computation is made at fixed time intervals the rate of change is limited to the fraction multiplied by the frequency of the timing pulse.

Note that this embodiment incorporates motion computations disclosed in my U.S. Pat. No. 4,262,336. This patent discloses a computer control of stepping motors which does not output pulses but outputs numbers indicating the motor position in its electrical cycle. Thus, there are no output pulses. Furthermore, the number of changes in the motor position is only related to the input pulses when the input rate is lower than the frequency of the timer 329. When the input rate is higher than the timer frequency the motor position is changed by amounts corresponding to two or more input pulses.

The last mode, number 7, is useful for manual control operations. Referring to FIG. 6, it simply acquires an analog velocity command 353 via the analog-to-digital converter 347. This value is used to increment the motor position. The motor position is then used to address the tables in the non-volatile memory 307 and passed to the motor 327 via registers 311 and 313, digital-to-analog converters 315 and 317 (where the motor position becomes position command signals), filters 319 and 321, and amplifiers 323 and 325. Referring to FIG. 7, the manual control begins in block 410 by waiting for a timing pulse. The computation begins in 412 by acquiring the velocity and computing the motor position according to the following FORTRAN code:

| | |
|---|---|
|   | NV = K * F * ADC(V) * (1−F) * OV |
|   | OV = NV |
|   | OP = OP + NV |
|   | R1 = W1(OP) |
|   | R2 = W2(OP) |
| C | where ADC is the analog-to-digital converter |
| C | V is the address of the velocity input |
| C | K is a preset constant |
| C | F is a preset time constant fraction |
| C | R1 is the phase one current register 311 |
| C | W1 is the phase one current table |
| C | R2 is the phase two current register 313 |
| C | W2 is the phase two current table |

Thus, this microprocess microstepping control system can meet effectively every stepping motor control situation requiring the sophistication of fractional stepping.

REITERATION

The antecedent disclosures described generation of a complex waveform of a plurality of step values with combination of analog and digital circuitry. The interpolation means for both linear and non-linear interpolation was disclosed in both analog and digital circuitry.

The present disclosure enhances the non-linear interpolations with quadratic and cubic interpolators.

Also from the preceding description of the preferred embodiments, it is evident that a stepping motor driver with adjustable waveforms can be created with either digital or analog techniques. Furthermore, the tuning process can be aided by a filter which is implemented in analog or digital circuitry. And still further the tuning aids can be built into the digital embodiment.

Further, it has been shown how the stepping motor drive may be set with a default waveform of step values for a generic or statistical motor.

From the preceding description, it is evident that the objects of the invention are attained. Although the invention has been described and illustrated in detail, it is to be clearly understood that the same is by way of illustration and example only and is not to be taken by way of limitation. The spirit and scope of this invention are to be limited only by the terms of the appended claims.

I claim:

1. A drive system for a stepping motor having a plurality of windings comprising: means for energizing said windings in response to position command signals; a plurality of adjustment means connected to said energizing means for adjusting segments of said position command signal, each of said adjustment means controlling the amplitude of a plurality of said segments, and at least one of said adjustment values controls some but not all of said segments of a position command signal.

2. The drive system of claim 1 wherein said adjustment means includes a plurality of potentiometers.

3. The drive system of claim 2 including multiplexer means for generating said position command signals, a multi-tapped voltage divider connected to the inputs of said multiplexer means, and said potentiometers adjust the voltages on the taps of said voltage divider.

4. The drive system of claim 1 wherein said adjustment means includes adjustment values contained in a digital storage means.

5. The drive system of claim 4 including a computer for generating said position command signal by addressing a digital storage means which contains values indicative of motor currents computed from said adjustment values.

6. The drive system of claim 1 wherein said position command signal has a d.c. bias and said adjustment means produces a d.c. bias in said position command signal.

7. The drive system of claim 1 wherein said adjustment means controls the relative amplitude of the energization signals applied to said windings.

8. The drive system of claim 1 wherein an adjustment means controls the extent that a portion of one position command signal is added to another position command signal.

9. The drive system of claim 1 which includes means for limiting the amplitude of said position command signals for limiting the dissipation of said motor.

10. The drive system of claim 1 including means for receiving pulses and generating said position command signal in response to said pulses.

11. The drive system of claim 10 including means for controlling the rate of change in the frequency of said position command signals.

12. The drive system of claim 1 including means for receiving an analog velocity command signal and generating said position command signals in response to said velocity command signal.

13. The drive system of claim 1 including means for receiving a signal indicative of the motion of said stepping motor and for controlling said adjustment means in response to the motion of said motor.

14. A stepping motor drive system having adjustment values comprising: first means for producing a position command signal in response to an input; a second means for energizing a stepping motor in response to said position command signal; and an interpolation means forming a part of said first means for defining a plurality of step values used to produce said position command signal.

15. The stepping motor drive system of claim 14 including means for adjusting said step values in response to an adjustment value.

16. The stepping motor drive system of claim 15 including means for receiving a signal indicative of the motion of said stepping motor and means for adjusting said adjustment value in response to the motion of said motor.

17. The drive system of claim 15 including multiplexer means for generating said position command signals, a multi-tapped voltage divider for producing said step values connected to the inputs of said multiplexer means, a potentiometer for producing said adjustment values connected to said voltage divider.

18. The drive system of claim 15 wherein said adjustment values are contained in a digital storage means.

19. The drive system of claim 18 including a computer for generating said position command signal by addressing a digital storage means which contains step values computed from said adjustment values.

20. The drive system of claim 15 wherein said position command signal has a d.c. bias and said adjustment value produces a d.c. bias in said position command signal.

21. The drive system of claim 15 wherein said adjustment value controls the relative amplitude of the energization signals applied to said windings.

22. The drive system of claim 15 wherein said adjustment value controls the extent that a portion of one position command signal is added to another position command signal.

23. The drive system of claim 15 which includes means for limiting the amplitude of said position command signals for limiting the dissipation of said motor.

24. The drive system of claim 15 including means for receiving pulses and forming a position command signal in response to said pulses.

25. The drive system of claim 24 including means for controlling the rate of change in the frequency of said position command signals.

26. The drive system of claim 15 including means for receiving an analog velocity command signal and forming said position command signals in response to said velocity command signal.

27. The stepping motor drive system of claim 14 wherein said interpolation is non-linear and defines said step values in response to three or more adjustment values.

28. The stepping motor drive system of claim 14 wherein said interpolation is linear and defines said step values in response to two or more adjustment values.

29. A stepping motor drive system having a plurality adjustment values and controlling a stepping motor having a plurality of windings in step increments fractions of the natural step of said motor comprising a first means for producing a plurality of position command signals in response to an input and said adjustment values, a second means for energizing said motor in response to said position command signal, and a third means for receiving a signal indicative of the motion of said motor, wherein said first means is responsive to said received motion signal for altering said adjustment values.

30. The drive system of claim 29 including means for presetting the adjustment values.

31. A tuner for stepping motor driver for energizing a stepping motor including a first means for producing digital position values in response to an input, a memory means for converting said position values to digital position commands, and a third means for energizing said stepping motor in response to said digital position commands, said tuner comprises
a sensing means for sensing the motion of said stepping motor, and signal processing and interpolating means responsive to said sensing means for altering the content of said memory means.

32. The tuning means of claim 31 wherein said interpolating means includes adjustment values, one of which affects some segments of said digital position command signal but not all segments of said position command signal.

33. The tuning means of claim 32 wherein one of said adjustment values introduces a fixed offset in a digital position command signal.

34. The tuning means of claim 32 wherein one of said adjustment values controls the relative magnitudes of the digital position command signals.

35. The tuning means of claim 32 wherein one of said adjustment values controls the extent that one of said digital position command signals alters another digital position command signal.

36. The tuning means of claim 32 including means for presetting said adjustment values.

37. A driving means for a stepping motor having a plurality of windings which are energized by a complex energization signal waveform to effect the motion of said motor, said drive circuit comprising: position command means for producing a position command signal waveform consisting of a fundamental and a plurality of harmonics; said position command means having limiting means to limit the amplitude of said position command signal to limit the motor dissipation.

38. The driving means of claim 37 in which said waveform contains a DC bias.

39. The driving means of claim 37 in which said position command means produces a plurality of position command signals of different amplitudes.

40. The driving means of claim 37 in which said position command means produces a plurality of position command signals and a portion of one of said signals is a component of another position command signal.

41. The driving means of claim 37 which includes means for receiving waveform alteration commands and alters said waveforms accordingly.

42. The driving means of claim 37 which includes means responsive to the motion of said stepping motor for equalizing the size of the motor steps.

43. A system for minimizing the effects of resonance in a stepping motor comprising: an adjustable waveform means for producing motor drive signals having a plurality of steps per electrical cycle of said motor; a sensor means for sensing the motion of a stepping motor and producing sensor data; data sampling means operating in synchronism with said waveform means for sampling said sensor data; filter means operating on said sampled data; means for adjusting said waveform means in response to said filtered data.

44. The system of claim 43 in which said filtering means includes a computer performing an Fourier analysis.

45. The system of claim 43 wherein said sensor means senses a plurality of electrical cycles of said stepping motor and combines the motion for corresponding steps of a plurality electrical cycles into a common value.

46. A driving system for a stepping motor having a plurality of windings comprising a first means responsive to an input for producing a position command signal including memory means for storing a table of values indicative of motor currents and indexed by motor position, a second means for energizing said stepping motor in response to said position command signal, and a third means for receiving a code for use by said first means for producing said table values in response to said code.

47. The driving system of claim 46 wherein said code is indicative of the ratio of the motor torques with one phase on to torques with two phases on.

48. The drive system of claim 46 where said first means includes means for receiving pulses and producing a position command signal in response to said pulses.

49. The drive system of claim 46 including means to control the rate of change in the frequency of said position command signals.

50. The drive system of claim 46 wherein said first means includes means for receiving an analog velocity command signal and forming said position command signals in response to said velocity command signal.

51. In a stepping motor driver having a position command means for producing a position command signal in response to an input and energization signal means responsive to said position command signal for developing an energization signal for a stepping motor, said position command means including a plurality of value sources and selector means for selecting one of said value sources in response to said input and developing a position command signal therefrom, the improvement comprising means for adjusting the values of said value sources in an interdependent manner.

52. The driver of claim 51 wherein said plurality of value sources is a plurality of voltage sources.

53. The driver of claim 52 wherein said plurality of voltage sources includes a common voltage divider to which said selector means is connected at a first plurality of points and said adjusting means includes a plurality of adjustable means for applying voltages at points along said voltage divider.

54. The driver of claim 52 wherein said energization signal means includes first and second means for developing first and second energization signals respectively having a phase difference, and phase control means connected between said first and second means for introducing a portion of said first energization signal into said second energization signal.

55. The driver of claim 54 wherein said phase control is adjustable to determine the amount of said first energization introduced into said second energization signal.

56. The driver of claim 54 wherein said second means includes gain control means for adjusting the gain of said second means relative to said first means.

57. The driver of claim 54 wherein said first and second means each include offset control means for adjusting the d.c. bias of said first and second energization signals.

58. The driver of claim 51 wherein said plurality of value sources is a digital memory means.

59. The driver of claim 58 wherein said adjusting means includes means for introducing a fixed offset in the plurality of value sources so that the energization signal has a d.c. bias.

60. The driver of claim 58 wherein said energization signal means includes first and second means for developing first and second energization signals respectively having a phase difference; and wherein said adjusting means includes means for altering said plurality of values so that a portion of said first energization signal is a component of said second energization signal.

61. The driver of claim 58 wherein said energization signal means includes first and second means for developing a first and second energization signals respectively having a gain difference; and wherein said adjusting means includes means for altering said plurality of values so the amplitudes of the first energization signal is adjustable relative to the amplitudes of said second energization signal.

62. The driving means of claim 51 wherein said position command means produces a position command signal containing a fundamental and a plurality of harmonics of said fundamental.

63. The drive system of claim 51 wherein said position command means includes means for receiving pulses and producing a position command signal in response to said pulses.

64. The drive system of claim 63 including means to control the rate of change in the frequency of said position command signals.

65. The drive system of claim 51 wherein said position command means includes means for receiving an analog velocity command signal and forming said position command signals in response to said velocity command signal.

66. The drive system of claim 58 which includes means for receiving a signal indicative of the motion of said stepping motor and adjusting said value sources in response to said motion signal.

67. A drive circuit for a stepping motor having a plurality of windings which are energized by a complex energization signal waveform to effect the motion of said motor, said drive circuit comprising position command means for producing a position command signal waveform consisting of a fundamental and a plurality of harmonics; said drive circuit including a plurality of adjustment means for varying the amplitude of said plurality of harmonics wherein one of said adjustment means varies the amplitude of at least two harmonics.

68. The drive circuit of claim 67 having means for receiving a signal indicative of the motion of said motor and means for adjusting said harmonics in response to said motion signal.

69. A stepping motor driver having a first means for generating a position command signal in response to an input and second means for generating an energization signal for a stepping motor in response to said position command signal; wherein said first means includes a plurality of signal sources, a plurality of first signal multiplexers for forming parts of the position command signal, and a second signal multiplexer for selecting said parts.

70. The stepping motor driver of claim 69 wherein said first means further includes amplifying means between said first and second multiplexers.

71. The stepping motor driver of claim 69 wherein said first means further includes adjustment means for adjusting the amplitude of said position command signal.

72. The stepping motor driver of claim 69 wherein said first means includes an interpolation means for generating said signal sources in response to a plurality of adjustment means.

73. The stepping motor driver of claim 72 wherein said interpolator means interpolates linearly.

74. The stepping motor driver of claim 72 wherein said interpolator means interpolates non-linearly.

75. The stepping motor driver of claim 69 wherein first means includes means for including a d.c. bias in said position command signal and means for adjusting said d.c. bias.

76. The stepping motor driver of claim 69 wherein said first means generates two position command signals and includes means for including a portion of one position command signal in the other position command signal and includes means for adjusting the amplitude of said portion.

* * * * *